United States Patent
Jain et al.

(10) Patent No.: US 10,635,675 B2
(45) Date of Patent: Apr. 28, 2020

(54) SUPPORTING PLUGGABLE DATABASES WITH HETEROGENEOUS DATABASE CHARACTER SETS IN A CONTAINER DATABASE

(71) Applicant: Oracle International Corporation, Redwood Shores, CA (US)

(72) Inventors: Sanket Jain, Sunnyvale, CA (US); Kumar Rajamani, San Ramon, CA (US); Jaebock Lee, Sunnyvale, CA (US); Giridhar Ravipati, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 563 days.

(21) Appl. No.: 15/192,837

(22) Filed: Jun. 24, 2016

(65) Prior Publication Data
US 2017/0116282 A1    Apr. 27, 2017

Related U.S. Application Data

(60) Provisional application No. 62/245,937, filed on Oct. 23, 2015.

(51) Int. Cl.
*G06F 16/2455* (2019.01)
*G06F 16/172* (2019.01)
(Continued)

(52) U.S. Cl.
CPC ...... *G06F 16/24566* (2019.01); *G06F 16/172* (2019.01); *G06F 16/214* (2019.01); *G06F 16/258* (2019.01)

(58) Field of Classification Search
CPC ............ G06F 17/30132; G06F 17/303; G06F 17/30513; G06F 17/30569; G06F 9/50
See application file for complete search history.

(56) References Cited

U.S. PATENT DOCUMENTS 6,804,671 B1    10/2004    Loaiza et al.
7,822,717 B2    10/2010    Kappor et al.
(Continued)

FOREIGN PATENT DOCUMENTS

WO    WO 2006045844 A1    5/2006
WO    WO 2014/052851      4/2014

OTHER PUBLICATIONS

Rajeev Kumar et al., ORACLE DBA, A Helping Hand, Container Database and Pluggable Database (CDB & PDB), retrieved from the internet on Dec. 4, 2013, 2 pages.
(Continued)

*Primary Examiner* — Matthew J Ellis
(74) *Attorney, Agent, or Firm* — Hickman Palermo Becker Bingham LLP (57) ABSTRACT

A pluggable database (PDB) that is encoded using a particular character set (differing character set) may be plugged into a container database (CDB) and queried, even when the CDB in which the particular PDB resides is encoded using a different character set. The DBMS records what character set is used to encode the PDB. Any predicate that may prune results from a PDB that is encoded in a differing character set is converted to the differing character set as needed, such that the predicate may be applied within the PDB to prune results. At times, cross-container views will require data from a PDB that is encoded using a differing character set. The data returned from a recursive query over the PDB is converted to being encoded using the character set of the root database of the CDB.

16 Claims, 5 Drawing Sheets

(51) Int. Cl.
*G06F 16/25* (2019.01)
*G06F 16/21* (2019.01)

(56) References Cited

U.S. PATENT DOCUMENTS

| | | | |
|---|---|---|---|
| 8,364,648 B1 | 1/2013 | Sim-Tang | |
| 2002/0112022 A1 | 8/2002 | Kazar et al. | |
| 2003/0061537 A1 | 3/2003 | Cha et al. | |
| 2004/0267809 A1 | 12/2004 | East et al. | |
| 2005/0038831 A1 | 2/2005 | Souder et al. | |
| 2005/0278276 A1 | 12/2005 | Andreev et al. | |
| 2006/0041574 A1* | 2/2006 | Cunningham | G06F 17/30327 |
| 2007/0100912 A1 | 5/2007 | Pareek et al. | |
| 2007/0244918 A1 | 10/2007 | Lee et al. | |
| 2009/0089332 A1* | 4/2009 | Harger | G06F 17/2288 |
| 2010/0185645 A1 | 7/2010 | Pazdziora | |
| 2010/0318570 A1 | 12/2010 | Narasinghanallur et al. | |
| 2011/0004586 A1 | 1/2011 | Cherryholmes et al. | |
| 2011/0060724 A1 | 3/2011 | Chan | |
| 2011/0087633 A1 | 4/2011 | Kreuder et al. | |
| 2011/0307450 A1 | 12/2011 | Hahn et al. | |
| 2012/0109926 A1 | 5/2012 | Novik et al. | |
| 2013/0080474 A1* | 3/2013 | Zhang | G06F 17/30513 707/797 |
| 2013/0085742 A1 | 4/2013 | Baker et al. | |
| 2013/0117237 A1 | 5/2013 | Thomsen et al. | |
| 2013/0212068 A1 | 8/2013 | Talius et al. | |
| 2014/0095452 A1 | 4/2014 | Lee et al. | |
| 2014/0095530 A1* | 4/2014 | Lee | G06F 11/1471 707/769 |
| 2014/0095546 A1 | 4/2014 | Kruglikov et al. | |
| 2014/0164331 A1 | 6/2014 | Li et al. | |
| 2014/0244632 A1* | 8/2014 | Tseng | G06F 16/24578 707/723 |
| 2015/0254240 A1 | 9/2015 | Li et al. | |

OTHER PUBLICATIONS

Preismesberger, Chris, "Oracle Profits Up, but Revenues Slip" Oracle, dated Sep. 20, 2012, 2 pages.
Oracle Base, Multitenant: Create and Configure a Pluggable Database (PDB) in Oracle Databse 12c Release 1 (12.1), dated Jan. 8, 2014, 16 pages.
Muhammad Anwar, "How to Install Oracle 12c Multitenant Pluggable Database", dated Feb. 24, 2012, 27 pages.
Garcia-Molina et al., "Database System Implementation", dated Jan. 1, 2000, 84 pages.
Francisco Munoz et al., "Oracle Databse 12c Backup and Recovery Survival Guide", dated Sep. 24, 2013, 8 pages.
Dominic Betts et al., "Developing Multi-Tenant Applications For The Cloud," 3rdEdition, Microsoft, 2012, 246 pages.
Das et al., "Albatross: Lightweight Elasticity in Shared Storage Databases for the Cloud Using Live Data Migration", Proceedings of VLDB Endowment, vol. 4, No. 8 Copyright, dated 2011, 12 pages.
Anonymous: "Oracle-Base—Multitenant: Overview of Container Databses (CDB) and Pluggable Databases (PDB)", dated Mar. 3, 2014, 4 pages.
Anonymouse: An Oracle White Paper Oracle Database Appliance: Migration Strategies, dated Jun. 2012, 14 pages.
U.S. Appl. No. 13/631,815, filed Sep. 28, 2012, Office Action, dated Nov. 6, 2014.
U.S. Appl. No. 13/631,815, filed Sep. 28, 2012, Notice of Allowance, dated Aug. 20, 2015.
U.S. Appl. No. 13/631,815, filed Sep. 8, 2012, Notice of Allowance, dated Apr. 3, 2015.
U.S. Appl. No. 13/631,815, filed on Sep. 28, 2012, Office Action, dated Dec. 23, 2013.
U.S. Appl. No. 13/631,815, filed Sep. 28, 2012, Office Action, dated May 29, 2014.
Baby, U.S. Appl. No. 15/331,657, filed Oct. 21, 2016, Office Action, dated Aug. 28, 2018.

* cited by examiner

402 — RECEIVE A CROSS-CONTAINER VIEW QUERY; WHEREIN THE CROSS-CONTAINER VIEW QUERY REQUESTS DATA FROM THE PARTICULAR PLUGGABLE DATABASE

404 — EXECUTE A RECURSIVE QUERY, THAT PERFORMS AT LEAST A FIRST PORTION OF THE CROSS-CONTAINER VIEW QUERY, TO RETRIEVE PARTICULAR DATA, ENCODED WITH THE SECOND CHARACTER SET, FROM THE PARTICULAR PLUGGABLE DATABASE

406 — BEFORE INCLUDING THE DATA FROM THE PARTICULAR PLUGGABLE DATABASE IN RESULTS FOR THE CROSS-CONTAINER VIEW QUERY, CONVERT THE PARTICULAR DATA FROM THE SECOND CHARACTER SET TO THE FIRST CHARACTER SET TO PRODUCE CONVERTED DATA

408 — INCLUDE THE CONVERTED DATA IN A RESULTS SET FOR THE CROSS-CONTAINER VIEW QUERY

410 — RETURN THE RESULTS SET AS A RESULT OF THE CROSS-CONTAINER VIEW QUERY

FIG. 5

SUPPORTING PLUGGABLE DATABASES WITH HETEROGENEOUS DATABASE CHARACTER SETS IN A CONTAINER DATABASE

CROSS-REFERENCE TO RELATED APPLICATIONS; BENEFIT CLAIM

This application claims the benefit of Provisional Appln. 62/245,937, filed Oct. 23, 2015, titled "Application Containers in Container Databases", the entire contents of which is hereby incorporated by reference as if fully set forth herein, under 35 U.S.C. § 119(e).

Furthermore, this application is related to U.S. Pat. No. 9,239,763, filed Sep. 28, 2012 and issued Jan. 19, 2016, titled "Container Database", the entire contents of which is hereby incorporated by reference as if fully set forth herein.

FIELD OF THE INVENTION

The present invention relates to maintaining and utilizing, within a particular container database, a pluggable database that is encoded using a different character set than the particular container database.

BACKGROUND

Database consolidation involves distributing and sharing computing resources among multiple databases. Databases may be consolidated using a container database management system. A consolidated database, such as a multitenant container database (CDB), includes one or more pluggable databases (PDBs). The container database in which a pluggable database is established is referred to herein as the container database of the pluggable database.

A container database includes a data dictionary, which comprises metadata that defines database objects in the container database. For example, the data dictionary for a given CDB will include metadata describing each PDB that is contained in the given CDB, including database objects included in each PDB. In effect, a database dictionary defines the totality of a database. Database objects include tables, table columns, and tablespaces. A tablespace comprises a set of one or more files that are used to store the data for various types of database objects, such as tables, indexes, etc.

Further, each pluggable database includes a separate PDB-specific database dictionary that comprises metadata that defines database objects contained in the pluggable database. If a database object is stored in a tablespace of a particular PDB, the data dictionary of the particular PDB maps the database object to the tablespace that holds the data for the database object.

The database dictionary within a pluggable database also includes metadata that indicates a database character set based on which character data in the pluggable database is encoded. Herein, the character set based on which character data of a pluggable database is encoded is referred to herein as follows: the character set with which the pluggable database is encoded; or the character set of the pluggable database.

Pluggable databases may be "plugged in" to a container database, and may be transported between database servers and/or database management systems (DBMSs). The container database may manage multiple pluggable databases and a given database server instance may serve those pluggable databases from the container database. As such, a given container database allows multiple pluggable databases to run on the same database server and/or database server instance, allowing the computing resources of a single database server or instance to be shared between multiple pluggable databases. In a container database management system, each pluggable database may be opened or closed in the container database independently from other pluggable databases.

A user may access a pluggable database by establishing a database session on the container database management system for that pluggable database, where a database session represents the connection between the user and the container database management system for accessing the pluggable database. A database session is initiated for a pluggable database by, for example, transmitting a request for a new connection to the container database management system, the request specifying the pluggable database. A container database management system may host multiple database sessions, each database session being for one of multiple pluggable databases and/or for the root database of a container database.

Generally, before a pluggable database may be accessed through a container database management system, the pluggable database must be encoded using the same character set as the character set of the container database in which the pluggable database resides. The character set with which a PDB is encoded, where the character set is different from the character set of the root database of the PDB's container database, is referred to herein as a "differing" character set. When a PDB is encoded using a differing character set, the character data of the PDB must be fully converted to encoding with the database character set of the container database.

However, it is a costly process to convert the character set encoding of a pluggable database, and there are, at times, reasons why a client would not wish to convert the encoding of a pluggable database. For example, since data conversion can result in data loss or data truncation, converted data is generally reviewed by an administrator, and any such errors must be rectified by the administrator to ensure that the data is free of such errors.

It is possible to perform joint queries over multiple databases that are encoded using different character sets. To perform such a joint query, a user may establish a database link between distinct databases that are encoded with different character sets. Such a link allows the user to access data from a remote database, e.g., as a source from within another database. The data retrieved from the remote database is converted to being encoded based on the character set of the database on which the query is run. Thus, a query can execute over data from multiple distinct databases and return a result set that is encoded using a single character set.

However, processing data over a database link requires user configuration of the database link. Further, performing a distributed query over multiple databases using a database link is less efficient than processing a query over a single database, such as over a consolidated database. Additionally, there are limitations as to what data types can be queried over a database link, which further reduces the utility of such database links.

As such, it would be beneficial to accommodate and query pluggable databases, within a container database, that are encoded with differing character sets. Also, it would be beneficial to be able to perform a query over multiple containers (where each container is encoded with a different character set) without requiring database links to connect the containers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments, a pluggable database that is encoded using a particular character set may be plugged into a container database and queried, even when the container database in which the particular pluggable database resides is encoded using a different character set. The DBMS records what character set is used to encode the pluggable database and converts, into the character set of the pluggable database, portions of queries over the pluggable database as needed. Specifically, according to embodiments, any predicate that may prune results from a pluggable database (that is encoded using a differing character set) is converted to the differing character set as needed, such that the predicate may be applied within the pluggable database to potentially reduce the amount of data retrieved from the pluggable database.

At times, cross-container views will require data from a pluggable database that is encoded using a differing character set. Thus, a recursive query is generated from the cross-container view query, where the recursive query retrieves the portion of data needed from the pluggable database. A recursive query is query generated to compute another query. A recursive query is need not be declared or otherwise specified in the other query, and is automatically generated by a DBMS.

The data returned from this recursive query is converted from being encoded with the differing character set to being encoded with the character set of the root database of the container database (the "CDB character set"). Such a conversion is referred to herein as a conversion from the differing character set to the CDB character set. Conversion from a differing character set to the CDB character set is performed for results, of the cross-container view query, that originate from any pluggable database that is encoded using a differing character set.

Figure 1:
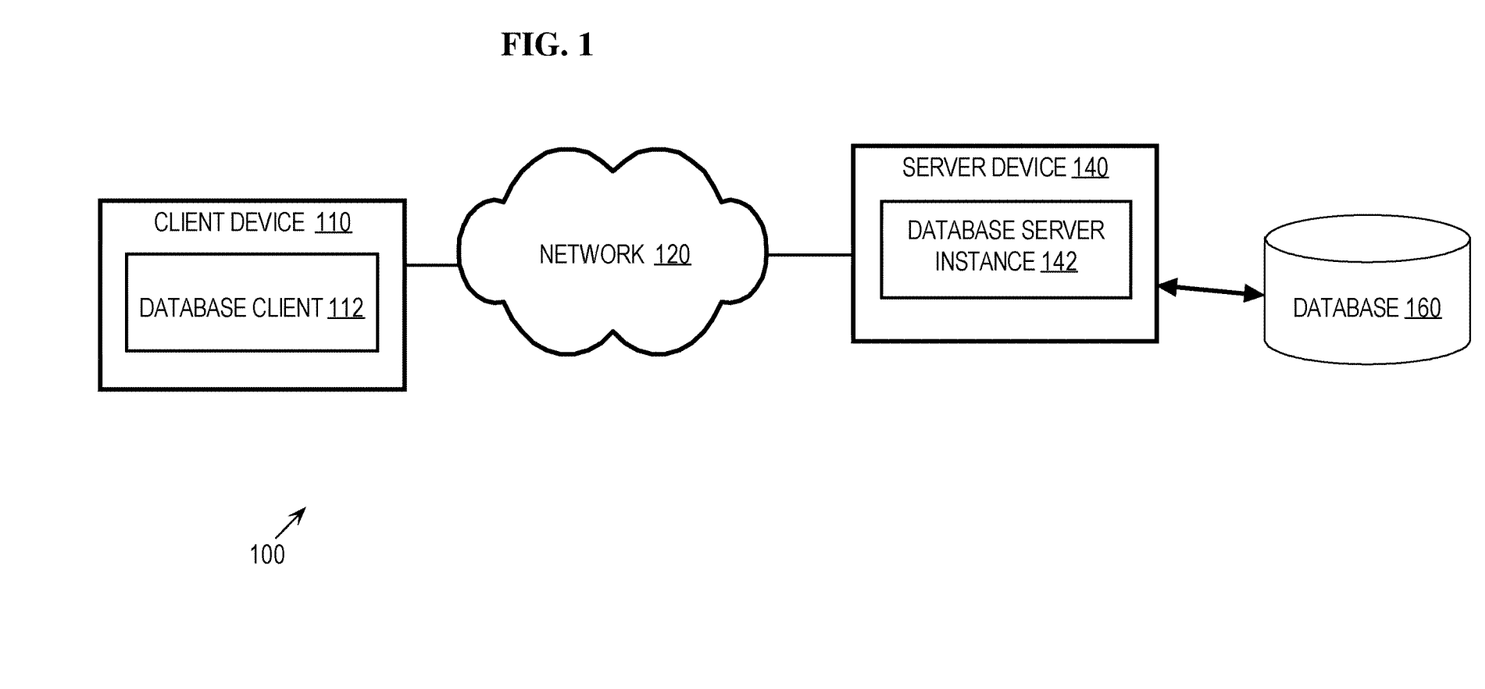
FIG. 1 is a block diagram that depicts an example network arrangement for managing one or more pluggable databases that are encoded using one or more differing database character sets.

Architecture for Managing a Pluggable Database Encoded with a Differing Character Set FIG. 1 is a block diagram that depicts an example network arrangement for managing one or more pluggable databases that are encoded using one or more differing database character sets, according to embodiments. Network arrangement 100 includes a client device 110 and a server device 140 communicatively coupled via a network 120. Example network arrangement 100 may include other devices, including client devices, server devices, storage devices, and display devices, according to embodiments.

Client device 110 may be implemented by any type of computing device that is communicatively connected to network 120. Example implementations of client device 110 include, without limitation, workstations, personal computers, laptop computers, personal digital assistants (PDAs), tablet computers, cellular telephony devices such as smart phones, and any other type of computing device.

In network arrangement 100, client device 110 is configured with a database client 112. Database client 112 may be implemented in any number of ways, including as a stand-alone application running on client device 110, or as a plugin to a browser running at client device 110, etc. Database client 112 may be implemented by one or more logical modules. Client device 110 may be configured with other mechanisms, processes and functionalities, depending upon a particular implementation.

Network 120 may be implemented with any type of medium and/or mechanism that facilitates the exchange of information between client device 110 and server device 140. Furthermore, network 120 may facilitate use of any type of communications protocol, and may be secured or unsecured, depending upon the requirements of a particular embodiment.

According to embodiments, server device 140 implements a single-server database management system (DBMS). According to embodiments, server device 140 is a node in a cluster of nodes managed by a multi-node DBMS, e.g., a shared-everything cluster database environment (such as Oracle Real Application Clusters ("RAC")). (See "Oracle Real Application Clusters (RAC)", An Oracle White Paper, June 2013, Oracle Database 12C documentation. The aforereferenced document is incorporated by reference as if fully set forth herein.) According to embodiments, any number of nodes may be part of a node cluster managed by a multi-node DBMS. Specifically, resources from multiple nodes in a multi-node database system can be allocated to run a particular database server's software.

Server device 140 is implemented by any type of computing device that is capable of communicating with client device 110 over network 120 and also capable of running a database server instance. In network arrangement 100, server device 140 is configured with database server instance 142.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients (such as database client 112 on client device 110).

Database server instance 142 on server device 140 maintains access to and manages data in database 160. According to an embodiment, access to a given database comprises access to (a) a set of disk drives storing data for the database, and (b) data blocks stored thereon. Database 160 may reside in any type of storage, including volatile and non-volatile storage, e.g., random access memory (RAM), one or more hard disks, main memory, etc.

One or more of the functions attributed to processes running on server device 140, as described herein, may be performed by services on other server devices that are communicatively coupled to network 120. Furthermore, any of the functionality attributed to database server instance 142 herein may be performed by another logical entity of network arrangement 100, according to embodiments. Also, database server instance 142 may be implemented by one or more logical modules, and is described in further detail below. Server device 140 may be configured with other mechanisms, processes, and functionalities, depending upon a particular implementation.

In an embodiment, each of the processes and/or functionality described in connection with database client 112, database server instance 142, and/or database 160 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database Systems

Embodiments of the present invention are used in the context of database management systems (DBMSs). Therefore, a description of a DBMS is useful. A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at client device 110 submits, via database client 112, a database server command to database server instance 142 with which database client 112 maintains a connection. A user may be one or more applications running on client device 110 that cause database client 112 to interact with database server instance 142. Multiple parties may access database resources through a given application. Multiple parties and/or users may also be referred to herein, collectively, as a user.

Container Database and Pluggable Database Architecture

Figure 2:
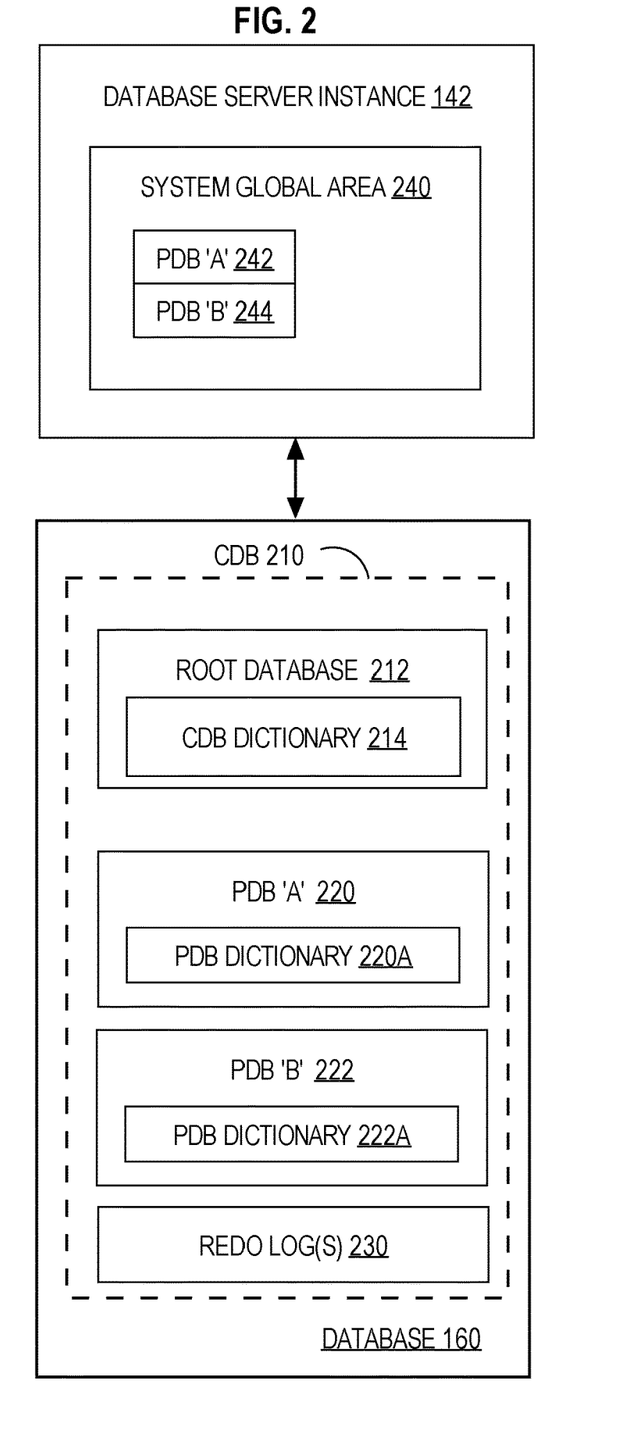
FIG. 2 depicts an example resource arrangement detailing database server instances and databases.

FIG. 2 depicts an example resource arrangement detailing embodiments of database server instance 142 and of database 160. Specifically, in FIG. 2, database 160 includes a root database 212 that represents the data for a CDB 210. CDB 210 is a container database that contains PDBs 220 and 222.

CDB 210 provides in-database virtualization for consolidating the multiple separate pluggable databases contained therein. Root database 212 is a database used to globally manage CDB 210, and to store data required to manage access to PDBs contained in CDB 210. Although root database 212 is depicted in FIG. 2 as a distinct database object separate from other database objects, any architectural implementation for storing container database data may be used within embodiments.

Root database 212 includes a CDB data dictionary 214. As indicated earlier, the database dictionary is central to a DBMS's management of a database. The database dictionary stored in the root database of a container database contains metadata that defines database objects physically or logically contained in the database. CDB dictionary 214 also stores metadata that indicates the character set that is used to encode data for the container database (i.e., for character data within root database 212 and for any representations of data, stored in system global area 240, from root database 212, etc.). Database objects include tables, indexes, columns, data types, users, user privileges, and storage structures used for storing database object data.

Example CDB 210 also includes redo log(s) 230. Redo logs in a given database include redo information that represents changes that have been made to data in the corresponding database. Each redo entry in the redo information that records a change made to a pluggable database includes information identifying the pluggable database in which the change was made, whether the change was committed, and a time at which the change was committed (if applicable). A redo entry may include any kind of information, depending upon particular implementations.

Benefits of the Multi Tenant Architecture

The multitenant architecture solves a number of problems posed by the traditional non-CDB architecture. For example, one challenge for non-CDB architecture involves managing many related databases. To illustrate, large enterprises may use hundreds or thousands of databases. Often these databases run on different platforms on multiple physical servers. Because of improvements in hardware technology, especially the increase in the number of CPUs, servers are able to handle heavier workloads than before. A database may use only a fraction of the server hardware capacity. This approach wastes both hardware and human resources.

For example, there are 100 server devices that maintain 100 databases, with each server maintaining one of the databases. Each database uses 10% of hardware resources of its host server device and requires 10% of an administrator's time. A team of DBAs must manage the system global area, database files, accounts, security, and so on, of each database separately, while system administrators must maintain 100 different computers.

A typical response to the management problem is to place multiple databases on each server device. The problem is that the multiple unconsolidated database instances do not share background processes, system and process memory, or metadata. Another response is to logically separate the data into schemas or virtual private databases. The problem is that these virtual entities are difficult to manage, secure, and transport.

Database consolidation, as described above, is the process of consolidating data from multiple databases into one database on one computer. Unlike database links, database consolidation involves managing multiple databases together as one database. With database linking, data from one database is made available (e.g., as a table) within a second database. With database linking, the linked databases remain distinct databases, and are managed as distinct databases (e.g., that must pass information via a network) notwithstanding the database link. Thus, when a pluggable database is plugged into (and established within) a container database, the pluggable database is managed by the database management system as part of the container database.

A pluggable database behaves the same as a non-CDB, as seen from a client connecting to the database. For example, the installation scheme for an application back end that runs against a non-CDB runs the same against a PDB and produces the same result. Also, the run-time behavior of client code that connects to the PDB containing the application back end is identical to the behavior of client code that is connected to a non-CDB containing this back end.

Operations that act on an entire non-CDB act in the same way on an entire CDB, for example, database replication and database backup and recovery. Thus, the users, administrators, and developers of a non-CDB have substantially the same experience after the database has been consolidated.

There are many benefits of maintaining databases within a container database management system. Returning to the previous example of 100 databases, database consolidation allows the databases to be effectively run on fewer server devices, which require fewer resources that need upkeep. More specifically, by consolidating hardware and sharing database memory and files, costs are reduced for hardware, storage, availability, and labor. For example, 100 pluggable databases within a single container database share one database instance and one set of database files, thereby requiring less hardware and fewer personnel.

The container database architecture allows for easier and more rapid movement of data and code. By design, a PDB can be quickly plugged into a CDB. Also, the PDB may be quickly unplugged from the CDB, and then plugged into a different CDB. The implementation technique for plugging and unplugging is similar to the transportable tablespace technique.

The container database architecture provides easier management and monitoring of the physical database. The CDB administrator can attend to one physical database (one set of files and one set of database instances) rather than split attention among dozens or hundreds of non-CDBs. Backup strategies and disaster recovery are simplified.

Furthermore, although consolidated into a single physical database, PDBs mimic the behavior of non-CDBs with regard to separation of data and code. For example, if user error loses critical data, a PDB administrator can use flashback or point-in-time recovery services to retrieve the lost data without affecting other PDBs.

Because multiple databases are managed jointly within the container database, a user need only issue a single command to patch or upgrade the container database, which results in fewer explicit installation instructions of database patches and upgrades. Simply put, it is easier to apply a patch to one container database containing 100 pluggable databases than to 100 non-CDB databases, and to upgrade one container database containing 100 pluggable databases than to upgrade 100 non-CDB databases.

Database Character Sets

When a database management system processes character data, the system uses numeric codes instead of a graphical representation of the character. For example, when a database stores data representing a given character (such as 'A'), the database actually stores a numeric code that the DBMS interprets as the character based on the database character set of the database. Any group of characters (for example, alphabetic characters, ideographs, symbols, punctuation marks, and control characters) can be encoded as a character set. An encoded character set assigns unique numeric codes, usually of a given width, to each character in the character repertoire of the character set. The numeric codes are called code points or encoded values.

The database character set of a particular database is established when the database is created. For example, the character encoding scheme used by the database is defined as part of a CREATE DATABASE statement. All columns that store character data, including columns in the data dictionary, store data that is encoded using the database character set. In addition, since object names are encoded using the database character set, the choice of database character set determines which characters can be included in object names in the database. Examples of character sets include JA16EUC (EUC 24-bit Japanese), AR8ISO8859P6 (ISO 8859-6 Latin/Arabic), EL8ISO8859P7 (ISO 8859-7 Latin/Greek), AL32UTF8 (Unicode 4.0 UTF-8 Universal character set), etc. Embodiments are described herein using particular character sets. However, such described character sets are non-limiting, and any character set may be used within embodiments.

According to embodiments, the database character set of a particular database encodes one or more of the following types of information: data stored in SQL CHAR data types (e.g., CHAR, VARCHAR2, CLOB, LONG, and STRING) within the particular database; identifiers such as table names, column names, and PL/SQL variables within the particular database; SQL and PL/SQL source code that is entered and/or stored for the particular database; etc. According to embodiments, SQL NCHAR data type columns (such as NCHAR, NCLOB, and NVARCHAR2) are encoded using a national character set for the particular database, which may be different than the database character set of the particular database.

A particular character set encodes characters using numerical values of a given width. Some character sets use set widths and some utilize varying widths for character encoding. For example, AL32UTF8 encodes characters using 4 bytes of data per character, and JA16EUC encodes characters using 3 bytes of data per character. In single-byte character sets, the number of bytes and the number of characters in a string are the same.

Using a Pluggable Database Encoded with a Differing Character Set

It can be desirable for a client to maintain and query a particular pluggable database that is encoded with a differing character set. As such, FIG. 3 depicts a flowchart 300 for querying data from a pluggable database that is encoded with a differing character set.

Figure 3:
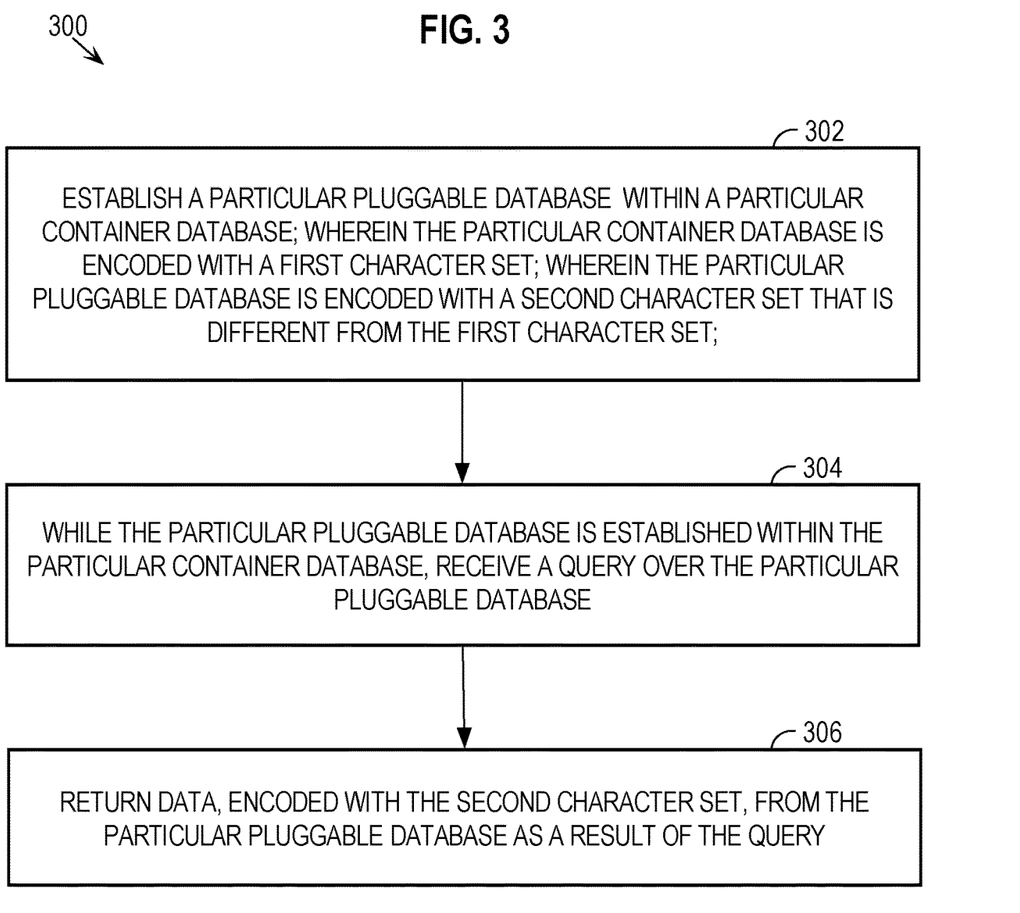
FIG. 3 depicts a flowchart for querying data from a pluggable database that is encoded with a differing character set.

At step 302 of FIG. 3, a particular pluggable database is established within a particular container database, where the particular container database is encoded with a first character set, and where the particular pluggable database is encoded with a second character set that is different from the first character set. For example, PDB 220, which is encoded using the character set JA16EUC, is plugged into CDB 210, which is encoded using the character set AL32UTF8. Since the character set with which PDB 220 is encoded is different than the character set with which CDB 210 is encoded, PDB 220 is encoded with a differing character set.

PDB dictionary 220A, stored within PDB 220, is the PDB-specific dictionary for PDB 220. According to embodiments, PDB dictionary 220A stores metadata that indicates what character set (JA16EUC), and national character set (if any), is used to encode character data within PDB 220. According to embodiments, PDB dictionary 220A also stores other National Language Support (NLS) settings for PDB 220, such as what language (English, Chinese, etc.) is represented within the PDB, length semantics used within the PDB, what currency is used within the PDB, etc.

When PDB 220 is first accessed via database server instance 142, instance 142 creates, within system global area 240, an in-memory representation 242 that represents certain metadata stored in PDB dictionary 220A. (To depict the connection between PDB 220 and in-memory representation 242, each entity is labeled 'A' in FIG. 2.) The in-memory representation for a given PDB includes, at least, an identifier of the database character set used to encode the PDB.

For each PDB that database server instance 142 opens, instance 142 creates such an in-memory representation of metadata from the dictionary of the PDB. To illustrate, instance 142 first accesses PDB 222 and, in connection with first opening PDB 222, creates an in-memory representation 244 that represents metadata stored in PDB dictionary 222A.

le;2qAccording to embodiments, character data stored within an in-memory representation is encoded using the same character set as the database character set of the PDB to which the representation corresponds. As such, data from in-memory representation 242 may be utilized in connection with data from within PDB 220 without conversion between character sets. Accordingly, the overhead of conversion of character data within in-memory representation 242 is incurred when the data from representation 242 is involved in a cross-container query (as described in further detail below), which requires that the data be encoded in the character set of CDB 210.

At step 304, while the particular pluggable database is established within the particular container database, a query, over the particular pluggable database, is received. For example, instance 142 hosts a particular database session that facilitates a connection between a particular user and PDB 220. The particular user issues a query, over PDB 220, to the database session. According to embodiments, all statements issued to a database session, that facilitates a connection with a given PDB, are encoded using the same character set as the PDB. Likewise, any statement issued to a database session that facilitates a connection with the root database of a particular CDB is encoded using the character set with which the particular CDB is encoded.

At step 306, data, encoded with the second character set, is returned from the particular pluggable database as a result of the query. Continuing with the previous example, in response to detecting that a query over PDB 220 has been issued to the particular database session, instance 142 initiates processing the query over PDB 220. According to embodiments, while initiating processing of the query, instance 142 determines the database character set, for PDB 220, based on the in-memory representation 242 that has been established within system global area 240 for PDB 220. From in-memory representation 242, instance 142 determines that PDB 220 is encoded using the character set JA16EUC.

Based on the database character set of PDB 220, instance 142 parses the data stored within PDB 220. Specifically, while determining what data to retrieve from PDB 220 for the query, instance 142 interprets the bytes of character data stored within PDB 220 based on the character set JA16EUC. Instance 142 gathers the needed data from PDB 220 without converting the data to a different character set. In this manner, instance 142 produces a results set that is encoded with the same character set as PDB 220, and returns this results set to the particular user that submitted the query.

According to embodiments, PDB 222 is encoded with a different character set than both CDB 210 and PDB 220. For example, PDB 222 is encoded using the character set EL8ISO8859P7. PDB 222 may be maintained and accessed in a manner similar to PDB 220 as described above while PDB 222 is established within CDB 210.

Cross-Container View Queries

A database view, or view, is a named logical representation of another table or combination of tables and is defined by a view query. A view derives its data from the tables on which the defining view query is based. These tables are called base tables. Base tables might in turn be actual tables or might be views/query results themselves.

Some views that are accessible from within a container database pull data from multiple containers. A container may be (a) a pluggable database, or (b) the root database of a CDB. Examples of such cross-container views include: CDB views; performance views such as dynamic performance tables ("V$ views"); etc.

To illustrate, a user issues a query to a database session that represents a connection with root database 212, where the query refers to a cross-container view. The cross-container view query, which is the query that defines the cross-container view, requires data from one or more PDBs. To perform the cross-container view query, instance 142 generates a recursive query to execute against each PDB referred to in the cross-container view query.

When cross-container view query involves a pluggable database that is encoded using a differing character set, the data pulled from that pluggable database must be converted to the CDB character set. This conversion ensures that all of the data in the resulting view is encoded using the same character set.

Figure 4:
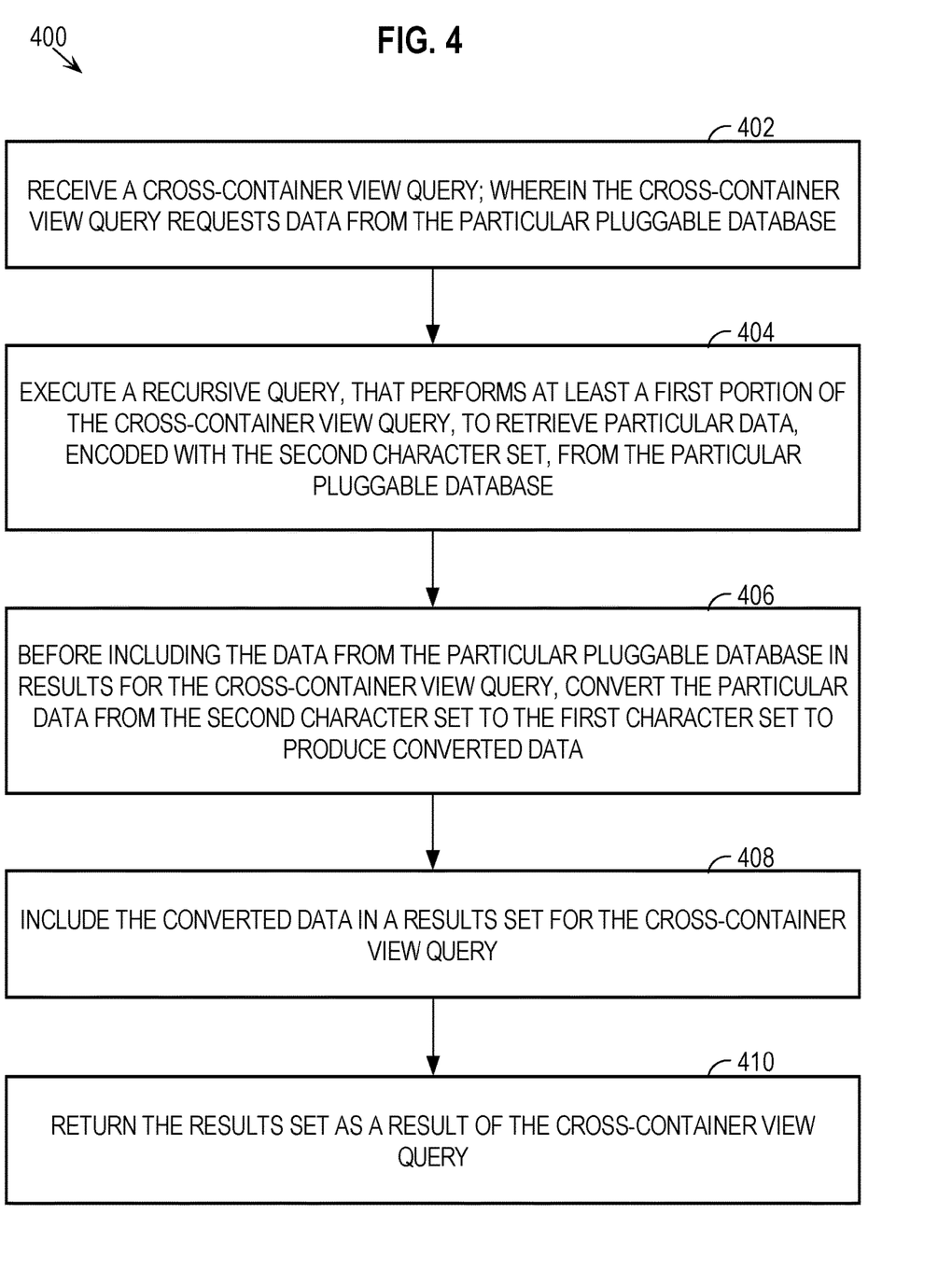
FIG. 4 depicts a flowchart for processing a cross-container view query that retrieves data from a pluggable database that is encoded with a differing character set.

FIG. 4 depicts a flowchart 400 for processing a cross-container view query that retrieves data from a pluggable database that is encoded with a differing character set, according to embodiments. At step 402, a cross-container view query is received, where the cross-container view query requests data from the particular pluggable database. For example, a user submits, to a database session that represents a connection to CDB 210, a query that selects data from the CDB view "CDB_OBJECTS" (which is a view that exposes attributes of objects stored within a particular CDB), such as the query:

SELECT owner, object_name, object_type, status, con_id
FROM CDB_OBJECTS
WHERE status < >'VALID'

The results of this query is information, from the CDB_OBJECTS view, that shows all objects within CDB 210 (including all PDBs contained in CDB 210) that have an "invalid" status. Since the query is run over CDB_OBJECTS, which is a view that is defined by a cross-container view query, running the example query requires running the query that defines the view CDB_OBJECTS.

For example, running the above query in a database session that represents a connection to CDB 210 produces the following results set:

| Owner | Object_Name | Object_Type | Status | Con_ID |
|---|---|---|---|---|
| Sys | Htmldb_System | Package Body | Invalid | 3 |
| Public | Apex_Pkg_App_Install_Log | Synonym | Invalid | 3 |
| Sys | Htmldb_System | Package Body | Invalid | 2 |
| Public | Apex_Pkg_App_Install_Log | Synonym | Invalid | 2 |

The CON_ID column identifies the PDB from which each of the returned rows originated. In the above query, CON_ID identifies PDBs that include the invalid objects. According to embodiments, the CON_ID column is a virtual column for which the DBMS is configured to return a PDB identifier, and does not refer to a materialized column within a table. If the Con_ID of PDB 220 is 2 and the Con_ID of PDB 222 is 3, then the results set lists two invalid objects within PDB 220 and two invalid objects within PDB 222.

At step 404, a recursive query is executed, where the recursive query performs at least a first portion of the cross-container view query, to retrieve particular data, encoded with the second character set, from the particular pluggable database. For example, instance 142 creates a recursive query over PDB 220 that retrieves all data needed, from PDB 220, for the cross-container view query that defines CDB_OBJECTS.

To illustrate, in the context of the above example query, instance 142 creates a recursive query that retrieves object information, for PDB 220, from PDB dictionary 220A. According to embodiments, at least a portion of the data that a recursive query retrieves from a given PDB is stored in the in-memory representation (within system global area 240) that corresponds to the PDB.

At step 406, before including the data from the particular pluggable database in results for the cross-container view query, converting the particular data from the second character set to the first character set to produce converted data. For example, any character data retrieved from PDB 220 for the cross-container view query, such as the object name data, is encoded using the differing character set of PDB 220. Instance 142 automatically detects that at least a portion of the data from PDB 220 is character data.

In response to detecting the presence of character data within the data retrieved from PDB 220, instance 142 identifies the database character set for PDB 220 from metadata stored in in-memory representation 242 (which corresponds to PDB 220). Instance 142 converts the data retrieved from the PDB 220 from the differing character set for PDB 220 to the CDB character set, i.e., from JA16EUC to AL32UTF8.

When gathering the results of the cross-container view query, instance 142 converts the results from any other recursive query over a PDB, that is encoded using a differing character set, to the CDB character set.

At step 408, the converted data is included in a results set for the cross-container view query. For example, instance 142 combines the converted results of the recursive query over PDB 220 with results from any other recursive query produced from the cross-container view query, such as by using a distributed join.

For example and according to embodiments, instance 142 creates a second recursive query that retrieves object information, for PDB 222, from PDB dictionary 222A. PDB 222 is encoded using a different character set than both PDB 220 and CDB 210, such as using the character set EL8ISO8859P7. In a manner similar to processing the recursive query over PDB 220 described above, instance 142 processes the recursive query over PDB 222, converting character data as described.

Since the results of all sub-queries produced from the cross-container view query are converted to the CDB character set, the results set for the cross-container view query is entirely encoded in the CDB character set.

At step 410, the results set is returned as a result of the cross-container view query. For example, instance 142 causes the results set, that includes the converted data from PDB 220, to be returned as a result of the cross-container view query. In the context of the example query above, the resulting view is used as a source from which data from the indicated columns (owner, object_name, object_type, status, and con_id) is selected.

According to embodiments, the root database of a CDB is encoded using a universally compatible (i.e., repertoire-compatible) character set, such as a Unicode character set (e.g., AL32UTF8), which provides a mapping for all representable characters from other character sets. Specifically, a repertoire-compatible character set is a character set that includes a mapping for all characters of any given other character set. In this way, when data from a pluggable database is converted from a differing character set to the CDB character set (the Unicode character set) in the absence of data width restrictions (an example of which is described in further detail below), the resulting data does not include bad (or garbage) characters or truncated characters.

Converting Queries Over a Pluggable Database that is Encoded with a Differing Character Set At times, within a consolidated system, a query issued to a first container requires data from a second container that is encoded using a different character set than the first container. For purposes of explanation, the first container is described herein as root database 212 of CDB 210 and the second container is described herein as PDB 220. However, the two containers may comprise any container within a consolidated database, according to embodiments.

Since the statements of a query issued to root database 212 are encoded using the CDB character set, character data within any predicates in the query are also encoded using the CDB character set. While encoded using the CDB character set, this predicate can be used to prune data retrieved from PDB 220 after the results have been converted to the CDB character set. However, if the predicate is to be pushed down to recursive queries performed over pluggable databases within CDB 210, the character data within the predicate included in the query executed against PDB 220 must be encoded using the differing character set of PDB 220.

To illustrate, a user issues the following query to a database session that represents a connection to CDB 210:

QA: SELECT ename FROM CONTAINERS(emp) WHERE emp.position < >'manager';

The query includes the predicate "emp.position < >'manager'", which requires that the attribute "emp.position", located in data within the containers within CDB 210 (i.e., PDBs 220 and 222), be a value other than the string "manager". Since it is a string, "manager" included in the query's predicate is represented with character data.

Such a predicate would be more useful if it is pushed down to prune results that are to be retrieved from PDB 220. For example, instance 142 creates the following recursive query to run over the containers within CDB 210:

QR: SELECT ename FROM emp WHERE emp.position <>'manager'

Thus, the predicate "emp.position <>'manager'" in QA is pushed down in recursive query QR. Instance 142 creates at least one version of QR in which the character data of the predicate in QR is converted to the differing character set of PDB 220.

Moving selection based on the predicate to the level of PDB 220 avoids the need to retrieve and convert data that does not satisfy the predicate. As such, before applying the predicate, instance 142 converts the predicate from the CDB character set to the differing character set of PDB 220.

Using the converted predicate, instance 142 filters the data within PDB 220, which allows instance 142 to retrieve, from PDB 220, only the data that satisfies the predicate. Thus, converting the predicate allows instance 142 to avoid the overhead of retrieving (and converting) data from PDB 220 that does not satisfy the predicate.

Length Semantics

At times, the length semantics used to define column lengths can affect proper conversion of table data. Calculating a number of characters, in character data, based on byte lengths can be difficult in a variable-width character set. Calculating column lengths in bytes is called byte semantics, while measuring column lengths in characters is called character semantics. According to embodiments, column lengths of a table within a PDB is indicated using character semantics, which allows conversion of data within the columns without the potential of truncating the data in the columns. According to embodiments, if column lengths are indicated using byte semantics in a table that contains data that is to be converted to a different character set, then the instance performing the query issues a warning to the user that truncation of the converted data is possible because of the column length definitions.

Character semantics is useful for defining the storage requirements for multibyte strings of varying widths. For example, in a Unicode database (e.g., AL32UTF8), suppose that there is need to define a VARCHAR2 column that can store up to five Chinese characters together with five English characters. Using byte semantics, this column requires 15 bytes for the Chinese characters, which are each three bytes long, and 5 bytes for the English characters, which are each one byte long, for a total of 20 bytes. Using character semantics, the column requires 10 characters.

The following expressions use byte semantics:
VARCHAR2(20 BYTE)
SUBSTRB(string, 1, 20)

Note the BYTE qualifier in the VARCHAR2 expression and the B suffix in the SQL function name.

The following expressions use character semantics:
VARCHAR2(10 CHAR)
SUBSTR(string, 1, 10)

Note the CHAR qualifier in the VARCHAR2 expression.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
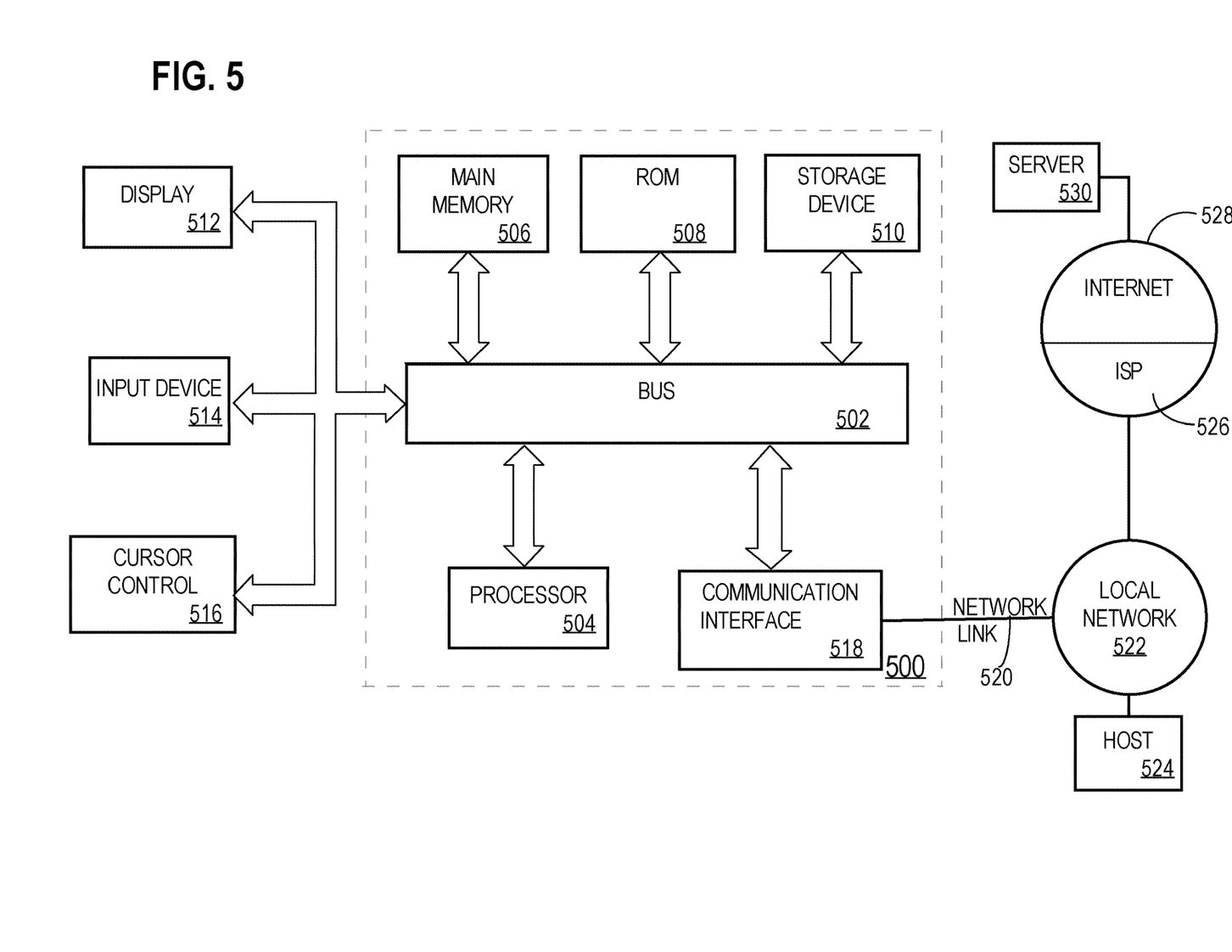
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   while a particular pluggable database is established within a particular container database, receiving a query over the particular pluggable database;
   wherein a container database dictionary defines database objects of the particular container database, and also identifies a set of pluggable databases that are contained by the particular container database;
   wherein the set of pluggable databases comprises the particular pluggable database;
   wherein the container database dictionary indicates that the particular container database is encoded with first numeric codes of a first character set;
   wherein a pluggable database dictionary, that is separate from the container database dictionary, defines database objects of the particular pluggable database and also indicates that the particular pluggable database is encoded with second numeric codes of a second character set that is different from the first character set; and
   returning data, encoded with the second numeric codes of the second character set, from the particular pluggable database as a result of the query;
   wherein the method is performed by one or more computing devices.

2. The computer-executed method of claim 1, wherein:
   the set of pluggable databases further comprises a second pluggable database; and
   the second pluggable database is encoded with third numeric codes of a third character set that is different from both of the first character set and the second character set.

3. The computer-executed method of claim 1, further comprising:
   storing, in memory, a representation of data from the particular pluggable database;
   wherein character data within the representation of data from the particular pluggable database is encoded using the second numeric codes of the second character set.

4. The computer-executed method of claim 1, wherein the first character set is a repertoire-compatible character set.

5. The computer-executed method of claim 1, further comprising:
   receiving a cross-container view query, wherein the cross-container view query requests data from the particular pluggable database;

executing a recursive query, that performs at least a first portion of the cross-container view query, to retrieve particular data, encoded with the second numeric codes of the second character set, from the particular pluggable database;

before including the particular data from the particular pluggable database in results for the cross-container view query, converting the particular data from being encoded with the second character set to being encoded with the first character set to produce converted data;

including the converted data in a results set for the cross-container view query; and returning the results set as a result of the cross-container view query.

6. The computer-executed method of claim 5, wherein:

the set of pluggable databases further comprises a second pluggable database;

the second pluggable database is encoded with third numeric codes of a third character set that is different from both of the first character set and the second character set;

the method further comprises:

executing a second recursive query, that performs at least a second portion of the cross-container view query, to retrieve second data, encoded with the third numeric codes of the third character set, from the second pluggable database;

before including the second data from the second pluggable database in results for the cross-container view query, converting the second data from being encoded with the third character set to being encoded with the first character set to produce second converted data;

including the second converted data in the results set for the cross-container view query; and wherein the results set that is returned as the result of the cross-container view query includes the second converted data.

7. The computer-executed method of claim 5, wherein:

at least part of the particular data is stored in a particular column; and a length of the particular column is defined using character semantics.

8. The computer-executed method of claim 5, wherein:

the recursive query includes a predicate containing character data;

the character data is encoded using the first numeric codes of the first character set;

the method further comprises, prior to executing the recursive query:

encoding the character data using the second numeric codes of the second character set to produce converted character data, and including the converted character data within the predicate of the recursive query.

9. One or more non-transitory computer-readable media storing one or more sequences of instructions that, when executed by one or more processors, cause:

while a particular pluggable database is established within a particular container database, receiving a query over the particular pluggable database;

wherein a container database dictionary defines database objects of the particular container database, and also identifies a set of pluggable databases that are contained by the particular container database;

wherein the set of pluggable databases comprises the particular pluggable database;

wherein the container database dictionary indicates that the particular container database is encoded with first numeric codes of a first character set;

wherein a pluggable database dictionary, that is separate from the container database dictionary, defines database objects of the particular pluggable database and also indicates that the particular pluggable database is encoded with second numeric codes of a second character set that is different from the first character set; and returning data, encoded with the second numeric codes of the second character set, from the particular pluggable database as a result of the query.

10. The one or more non-transitory computer-readable media of claim 9, wherein:

the set of pluggable databases further comprises a second pluggable database; and the second pluggable database is encoded with third numeric codes of a third character set that is different from both of the first character set and the second character set.

11. The one or more non-transitory computer-readable media of claim 9, wherein the one or more sequences of instructions further comprise instructions that, when executed by one or more processors, cause:

storing, in memory, a representation of data from the particular pluggable database;

wherein character data within the representation of data from the particular pluggable database is encoded using the second numeric codes of the second character set.

12. The one or more non-transitory computer-readable media of claim 9, wherein the first character set is a repertoire-compatible character set.

13. The one or more non-transitory computer-readable media of claim 9, wherein the one or more sequences of instructions further comprise instructions that, when executed by one or more processors, cause:

receiving a cross-container view query, wherein the cross-container view query requests data from the particular pluggable database;

executing a recursive query, that performs at least a first portion of the cross-container view query, to retrieve particular data, encoded with the second numeric codes of the second character set, from the particular pluggable database;

before including the particular data from the particular pluggable database in results for the cross-container view query, converting the particular data from being encoded with the second character set to being encoded with the first character set to produce converted data;

including the converted data in a results set for the cross-container view query; and returning the results set as a result of the cross-container view query.

14. The one or more non-transitory computer-readable media of claim 13, wherein the set of pluggable databases further comprises a second pluggable database;

the second pluggable database is encoded with third numeric codes of a third character set that is different from both of the first character set and the second character set;

the one or more sequences of instructions further comprise instructions that, when executed by one or more processors, cause:

executing a second recursive query, that performs at least a second portion of the cross-container view query, to retrieve second data, encoded with the third numeric codes of the third character set, from the second pluggable database;

before including the second data from the second pluggable database in results for the cross-container view query, converting the second data from being encoded with the third character set to being encoded with the first character set to produce second converted data;

including the second converted data in the results set for the cross-container view query; and wherein the results set that is returned as the result of the cross-container view query includes the second converted data.

15. The one or more non-transitory computer-readable media of claim 13, wherein:

at least part of the particular data is stored in a particular column; and a length of the particular column is defined using character semantics.

16. The one or more non-transitory computer-readable media of claim 13, wherein:

the recursive query includes a predicate containing character data;

the character data is encoded using the first numeric codes of the first character set;

the onbe or more sequences of instructions further comprise instructions that, when executed by one or more processors, cause, prior to executing the recursive query:

encoding the character data using the second numeric codes of the second character set to produce converted character data, and including the converted character data within the predicate of the recursive query.

* * * * *

UNITED STATES PATENT AND TRADEMARK OFFICE
CERTIFICATE OF CORRECTION

| | | |
|---|---|---|
| PATENT NO. | : 10,635,675 B2 | Page 1 of 1 |
| APPLICATION NO. | : 15/192837 | |
| DATED | : April 28, 2020 | |
| INVENTOR(S) | : Jain et al. | |

It is certified that error appears in the above-identified patent and that said Letters Patent is hereby corrected as shown below:

On the Title Page

On page 2, Column 2, under Other Publications, Line 1, delete "Preismesberger," and insert -- Preimesberger, --, therefor.

On page 2, Column 2, under Other Publications, Line 4, delete "Databse" and insert -- Database --, therefor.

On page 2, Column 2, under Other Publications, Line 10, delete "Databse" and insert -- Database --, therefor.

On page 2, Column 2, under Other Publications, Line 16, after "of" insert -- the --.

On page 2, Column 2, under Other Publications, Line 19, delete "Databses" and insert -- Databases --, therefor.

On page 2, Column 2, under Other Publications, Line 21, delete "Anonymouse:" and insert -- Anonymous: --, therefor.

In the Claims

In Column 18, Line 56, in Claim 14, after "wherein" insert -- : --.

In Column 20, Line 9, in Claim 16, delete "onbe" and insert -- one --, therefor.

Signed and Sealed this
Twentieth Day of April, 2021

Drew Hirshfeld
*Performing the Functions and Duties of the
Under Secretary of Commerce for Intellectual Property and
Director of the United States Patent and Trademark Office*